United States Patent
Yao et al.

(10) Patent No.: US 10,340,551 B2
(45) Date of Patent: Jul. 2, 2019

(54) ELECTROLYTE FOR NONAQUEOUS SECONDARY BATTERY AND NONAQUEOUS SECONDARY BATTERY USING THE SAME

(71) Applicant: National Institute of Advanced Industrial Science and Technology, Tokyo (JP)

(72) Inventors: Masaru Yao, Osaka (JP); Hikaru Sano, Osaka (JP); Hisanori Ando, Osaka (JP); Tetsu Kiyobayashi, Osaka (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 58 days.

(21) Appl. No.: 15/501,348

(22) PCT Filed: Aug. 11, 2015

(86) PCT No.: PCT/JP2015/072782
§ 371 (c)(1),
(2) Date: Mar. 16, 2017

(87) PCT Pub. No.: WO2016/024594
PCT Pub. Date: Feb. 18, 2016

(65) Prior Publication Data
US 2017/0229738 A1    Aug. 10, 2017

Related U.S. Application Data

(63) Continuation of application No. PCT/JP2015/072782, filed on Aug. 11, 2015.

(30) Foreign Application Priority Data

Aug. 12, 2014  (JP) .................................. 2014-164095

(51) Int. Cl.
*H01M 8/06*     (2016.01)
*H01M 10/0568*  (2010.01)
(Continued)

(52) U.S. Cl.
CPC ....... *H01M 10/0568* (2013.01); *H01M 4/485* (2013.01); *H01M 4/583* (2013.01);
(Continued)

(58) Field of Classification Search
CPC .. H01M 10/0568; H01M 10/05; H01M 4/485; H01M 4/583; H01M 4/60; H01M 4/602
See application file for complete search history.

(56) References Cited

FOREIGN PATENT DOCUMENTS

| EP | 0239976 A2 | 10/1987 |
|---|---|---|
| JP | 562229773 A | 10/1987 |

(Continued)

OTHER PUBLICATIONS

Kobayashi et al "(CH)x/(CH)x Battery with Unsymmetrical Tetraalkyl Ammonium Salt" Synthetic Metals vol. 18, pp. 619-624, 1987.
(Continued)

*Primary Examiner* — Jane J Rhee
(74) *Attorney, Agent, or Firm* — Cesari and McKenna, LLP

(57) ABSTRACT

A rocking-chair nonaqueous secondary battery, which uses an ion other than monatomic ions as a charge carrier, and in which the ion moves in and out of both the positive electrode and the negative electrode, can be provided by using a nonaqueous secondary battery electrolyte comprising a salt containing a charge carrier comprising a molecular ion. The nonaqueous secondary battery further comprises a positive electrode containing a positive electrode active material, and a negative electrode containing a negative electrode active material, wherein the positive electrode active material and the negative electrode active material are both materials that
(Continued)

allow doping and dedoping of molecular anions (e.g., conductive polymers, organic radical polymers, polymers having a ferrocene skeleton, conductive carbon materials, or organic sulfur compounds), or the positive electrode active material and the negative electrode active material are both materials that allow doping and dedoping of molecular cations (e.g., inorganic active materials, redox active molecules having a carbonyl group, redox active molecules having an imine skeleton, or redox active molecules containing a sulfur atom).

17 Claims, 3 Drawing Sheets

(51) Int. Cl.
  *H01M 4/485* (2010.01)
  *H01M 4/583* (2010.01)
  *H01M 4/60* (2006.01)
  *H01M 10/05* (2010.01)
(52) U.S. Cl.
  CPC ............ *H01M 4/60* (2013.01); *H01M 4/602* (2013.01); *H01M 10/05* (2013.01)

(56) References Cited

FOREIGN PATENT DOCUMENTS

| | | |
|---|---|---|
| JP | 6459780 | 3/1989 |
| JP | 2012022924 | 2/2012 |
| JP | 2012221885 | 11/2012 |
| JP | 2012221886 | 11/2012 |
| JP | 2014071965 | 4/2014 |

OTHER PUBLICATIONS

Extended European Search Report issued for European Application No. 15 832 650.4.
Jones et al. "The Association Constants of Triethyloxonium Salts and their Solvation by Diethyl Ether", Chemical Communications, 1970, pp. 1018-1019.
Kolditz et al. "The reaction of $PF_5.CH_3CN$ with sulfide", Z. Chem., 1980, pp. 303-304.
Li et al. "Physicochemical Characterization of $MF_m$—Based Ammonium Ionic Liquids", Journal of Chemical & Engineering Data, 2013, vol. 58, No. 6, pp. 1505-1515.
Office Action dated Nov. 2, 2018 issued in corresponding European Patent Application No. 15 832 650.4.
Office Action dated Jan. 8, 2019 issued in corresponding Japanese Patent Application No. 2016-542,590.

ELECTROLYTE FOR NONAQUEOUS SECONDARY BATTERY AND NONAQUEOUS SECONDARY BATTERY USING THE SAME

CROSS REFERENCE TO RELATED APPLICATIONS

This application is the National Stage of International Application No. PCT/JP2015/072782, filed on Aug. 11, 2015, which claims the benefit of Japanese Application No. 2014-164095, filed on Aug. 12, 2014. The contents of both applications are hereby incorporated in their entirety.

TECHNICAL FIELD

The present invention relates to a nonaqueous secondary battery electrolyte, and a nonaqueous secondary battery using the same.

BACKGROUND ART

Nonaqueous secondary batteries with a high energy density, such as lithium ion secondary batteries, are widely used for power sources of notebook computers, mobile phones, etc. Further, in addition to power sources of power tools and power sources of electric cars, the development of nonaqueous secondary batteries as, for example, power sources of portable electronic devices, such as mobile phones and notebook computers, has recently been progressing.

Thus, lithium ion secondary batteries are currently used for various power sources. One reason for this is that the use of lithium ions, which are elements with the highest ionization tendency, as a charge carrier allows a reduction in the potential of the negative electrode; consequently, the voltage as a battery increases. Nonaqueous secondary batteries using sodium ions, magnesium ions, or the like as a charge carrier are also known as post-lithium ion secondary batteries. In principle, however, the potential of the negative electrode is not less than the potential of metal lithium; after all, the performance of many post-lithium ion secondary batteries is much lower than that of lithium ion secondary batteries, which use lithium ions as a charge carrier.

Moreover, dendrite formation is one of the main drawbacks in nonaqueous secondary batteries using metal ions as a charge carrier, such as lithium ion secondary batteries. Various measures are taken to prevent dendrite formation; however, there is no sufficient solution.

On the other hand, an example using a salt containing a molecular ion is also known (e.g., PTL 1). In this case, however, lithium ions were used as a charge carrier bearing a negative electrode reaction.

CITATION LIST

Patent Literature

PTL 1: JP2014-071965A

SUMMARY OF INVENTION

Technical Problem

In PTL 1, ions moving in and out of the positive electrode are different from ions moving in and out of the negative electrode (the charge carrier of the positive electrode reaction is different from the charge carrier of the negative electrode reaction), and the concentration of the electrolyte is reduced during charging. Thus, practical problems still remain. Moreover, the dendrite problem also still remains. On the other hand, it is expected that if rocking-chair nonaqueous secondary batteries, which use an ion other than monatomic ions as a charge carrier, and in which the same ion moves in and out of both the positive electrode and the negative electrode, can be configured, nonaqueous secondary batteries that exhibit performance superior to that of lithium ion secondary batteries can be produced.

Therefore, an object of the present invention is to provide a rocking-chair nonaqueous secondary battery, which uses an ion other than monatomic ions as a charge carrier, and in which the ion moves in and out of both the positive electrode and the negative electrode.

Solution to Problem

The present inventors conducted extensive research to achieve the above object. As a result, the present inventors found that when a nonaqueous secondary battery electrolyte contained a salt containing a charge carrier comprising a molecular ion, the molecular ion functioned as a charge carrier. In this case, the nonaqueous secondary battery electrolyte may contain an alkali metal ion, but is preferably free from a charge carrier comprising an alkali metal ion. Moreover, it is preferable that substances that can deliver and receive the molecular ion are used as the positive electrode active material and the negative electrode active material. The present invention has been completed upon further research based on these findings. That is, the present invention includes the following structures.

Item 1. A nonaqueous secondary battery electrolyte comprising a salt containing a charge carrier comprising a molecular ion.

Item 2. The nonaqueous secondary battery electrolyte according to item 1, which is free from a charge carrier comprising an alkali metal ion.

Item 3. The nonaqueous secondary battery electrolyte according to item 1 or 2, wherein the salt containing a charge carrier comprising a molecular ion is a salt consisting of molecular ions.

Item 4. The nonaqueous secondary battery electrolyte according to any one of items 1 to 3, wherein the salt containing a molecular ion is a salt comprising:

a molecular cation represented by Formula (1):

wherein Y is an atom of Group 15 or 16 of the periodic table; $R^1$ is the same or different, and is an alkyl group, an alkoxy group, or a halogen atom; the two $R^1$ may be bonded to form a ring together with adjacent Y; and m is 3 or 4; and a molecular anion represented by Formula (2):

wherein Z is a boron atom or an atom of Group 15 of the periodic table; $R^2$ is the same or different, and is an alkyl group, an alkoxy group, a halogen atom, or a group represented by $-SO_2Rf$, wherein Rf is a fluorine atom or a fluoroalkyl group; and n is an integer of 2 to 6;

a triflate anion ($CF_3SO_3^-$), or a perchlorate ion.

Item 5. A nonaqueous secondary battery comprising the nonaqueous secondary battery electrolyte according to any one of items 1 to 4.

Item 6. The nonaqueous secondary battery according to item 5, further comprising a positive electrode containing a positive electrode active material, and a negative electrode containing a negative electrode active material;

wherein the positive electrode active material and the negative electrode active material are both materials that allow doping and dedoping of molecular anions, or the positive electrode active material and the negative electrode active material are both materials that allow doping and dedoping of molecular cations.

Item 7. The nonaqueous secondary battery according to item 6, wherein the materials that allow doping and dedoping of molecular anions are at least one member selected from the group consisting of conductive polymers, organic radical polymers, polymers having a ferrocene skeleton, conductive carbon materials, and organic sulfur compounds.

Item 8. The nonaqueous secondary battery according to item 6 or 7, wherein the materials that allow doping and dedoping of molecular cations are at least one member selected from the group consisting of inorganic active materials, redox active molecules having a carbonyl group, redox active molecules having an imine skeleton, and redox active molecules containing a sulfur atom.

Item 9. The nonaqueous secondary battery according to any one of items 5 to 8, which is a rocking-chair battery.

Advantageous Effects of Invention

According to the present invention, the nonaqueous secondary battery electrolyte comprises a salt containing a charge carrier comprising a molecular ion, and the molecular ion functions as a charge carrier in both the positive electrode reaction and the negative electrode reaction; therefore, a rocking-chair nonaqueous secondary battery, in which the ion moves in and out of both the positive electrode and the negative electrode, can be provided.

The ion conductivity of molecular ions is higher than the ion conductivity of lithium ions. For example, the limiting molar conductivity of molecular ions, such as tetramethyl ammonium cation, hexafluorophosphate anion, etc., is about twice the limiting molar conductivity of lithium ions. Accordingly, the nonaqueous secondary battery of the present invention, which uses a salt containing a charge carrier comprising a molecular ion, is expected to have higher input/output characteristics.

Further, according to the present invention, which uses a salt containing a charge carrier comprising a molecular ion (the molecular ion functions as a charge carrier), appropriate selection of the molecular ion allows the molecular ion to function at a potential lower than that of lithium ions, which are conventionally supposed to be able to function at the lowest potential. The voltage is further expected to increase, and the energy density is also further expected to increase.

Moreover, the present invention allows charging and discharging without using minor metals, such as cobalt; thus, lower cost can be realized.

Furthermore, the nonaqueous secondary battery comprising the nonaqueous secondary battery electrolyte of the present invention does not use alkali metal ions, such as lithium ions or alkaline earth metal ions, as the charge carrier (such ions do not contribute to the electrode reactions); therefore, the dendrite problem does not occur, and safety is high.

In addition, the present invention allows the use of any known separator. Thus, there are many material options, and lower cost can be realized.

DESCRIPTION OF EMBODIMENTS

1. Nonaqueous Secondary Battery Electrolyte

Figure 1:
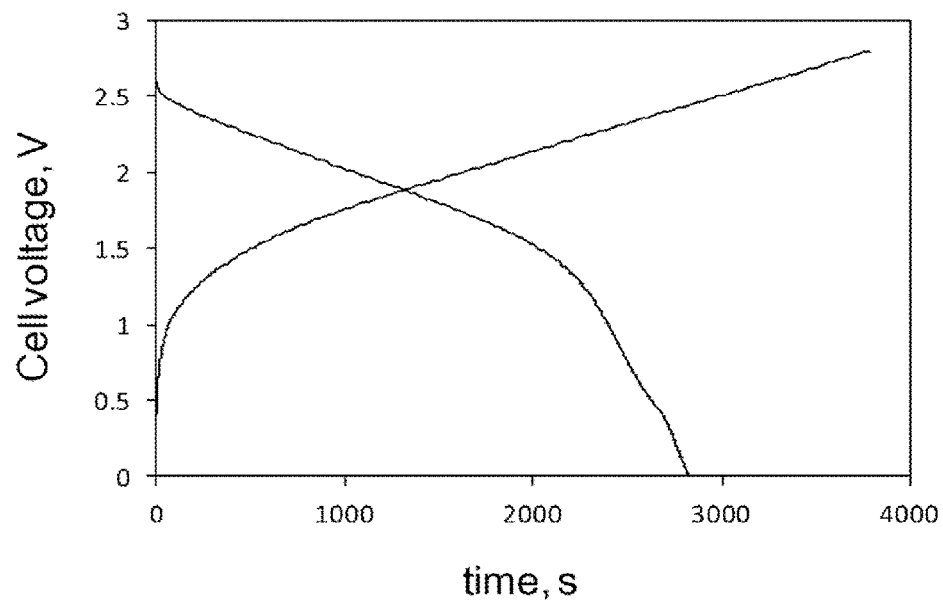
FIG. 1 is a graph showing the results of Test Example 1 (charge-discharge test of Example 1; charge-discharge curves).

A nonaqueous electrolyte is generally used as the nonaqueous secondary battery electrolyte of the present invention.

In the conventional nonaqueous electrolyte, an electrolyte salt, such as a lithium salt containing a charge carrier comprising a lithium ion, is generally dissolved. In the present invention, the nonaqueous electrolyte comprises a salt containing a charge carrier comprising a molecular ion. The molecular ion refers to an ion (multiatomic ion) comprising a plurality of atoms that form a covalent bond or a complex, and works as a single structure to form a salt. Further, the charge carrier refers to an ion that bears a positive electrode reaction and/or a negative electrode reaction, and that moves in and out of a positive electrode and/or a negative electrode. This means that if the nonaqueous secondary battery electrolyte contains an ion that does not move in and out of both the positive electrode and the negative electrode, this ion is not a charge carrier.

The salt containing a charge carrier comprising a molecular ion contains a molecular cation and/or a molecular anion as the molecular ion. In order for the molecular ion to more reliably serve as the charge carrier (to function as the charge carrier), this salt preferably comprises a molecular cation and a molecular anion. The molecular cation refers to a cation (multiatomic cation) comprising a plurality of atoms that form a covalent bond or a complex, and the molecular anion refers to an anion (multiatomic anion) comprising a plurality of atoms that form a covalent bond or a complex.

The molecular cation that can be contained in the salt containing a charge carrier comprising a molecular ion is not particularly limited. In terms of ion conductivity (input and output characteristics of the nonaqueous secondary battery) and the operating potential of the nonaqueous secondary battery, preferable is a molecular cation represented by Formula (1):

(1)

wherein Y is an atom of Group 15 or 16 of the periodic table; $R^1$ is the same or different, and is an alkyl group, an alkoxy group, or a halogen atom; the two $R^1$ may be bonded to form a ring together with adjacent Y; and m is 3 or 4.

In Formula (1), Y is an atom of Group 15 or 16 of the periodic table. In terms of ion conductivity (input and output characteristics of the nonaqueous secondary battery) and the operating potential of the nonaqueous secondary battery, Y is preferably a nitrogen atom, a phosphorus atom, an oxygen atom, a sulfur atom, or the like; and more preferably a nitrogen atom.

In Formula (1), the alkyl group represented by $R^1$ is preferably a $C_{1-10}$ alkyl group, and more preferably a $C_{1-6}$ alkyl group, in terms of ion conductivity (input and output characteristics of the nonaqueous secondary battery) and the operating potential of the nonaqueous secondary battery. The alkyl group may be either a linear alkyl group or a branched alkyl group, and is preferably a linear alkyl group. Specific examples of the alkyl group include a methyl group, an ethyl group, an n-propyl group, an n-butyl group, etc.; and preferably an n-butyl group etc.

In Formula (1), the alkyl group represented by $R^1$ may be substituted or unsubstituted. Examples of the substituent are not particularly limited, and include hydroxyl groups, halogen atoms (fluorine, chlorine, bromine, iodine, etc.), and the like. When the alkyl group is substituted, the number of substituents is not particularly limited, and is, for example, 1 to 3.

In Formula (1), the alkoxy group represented by $R^1$ is preferably a $C_{1-10}$ alkoxy group, more preferably a $C_{1-6}$ alkoxy group, and even more preferably a $C_{1-3}$ alkoxy group, in terms of ion conductivity (input and output characteristics of the nonaqueous secondary battery) and the operating potential of the nonaqueous secondary battery. The alkoxy group may be either a linear alkoxy group or a branched alkoxy group, and is preferably a linear alkoxy group. Specific examples of the alkoxy group include a methoxy group, an ethoxy group, an n-propoxy group, an n-butoxy group, and the like.

In Formula (1), the alkoxy group represented by $R^1$ may be substituted or unsubstituted. Examples of the substituent are not particularly limited, and include hydroxyl groups, halogen atoms (fluorine, chlorine, bromine, iodine, etc.), and the like. When the alkoxy group is substituted, the number of substituents is not particularly limited, and is, for example, 1 to 3.

In Formula (1), the halogen atom represented by $R^1$ is a fluorine atom, a chlorine atom, a bromine atom, an iodine atom, or the like.

Moreover, in Formula (1), the two $R^1$ may be bonded to form a ring together with adjacent Y. Examples of the ring include the following:

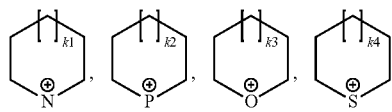

wherein k1, k2, k3, and k4 are each an integer of 0 or more (particularly 0 to 3).

Among the above, $R^1$ is preferably an alkyl group.

In Formula (1), the number of $R^1$ is plural, and the plural number of $R^1$ may be the same or different.

In Formula (1), m, which represents the number of $R^1$, is variable depending on the type of Y, but is 3 or 4. Specifically, m is preferably 4 when Y is an atom of Group 15 (a nitrogen atom, a phosphorus atom, etc.), and m is preferably 3 when Y is an atom of Group 16 (an oxygen atom, a sulfur atom, etc.).

The molecular cation that satisfies the above conditions is not particularly limited. Examples include the following:

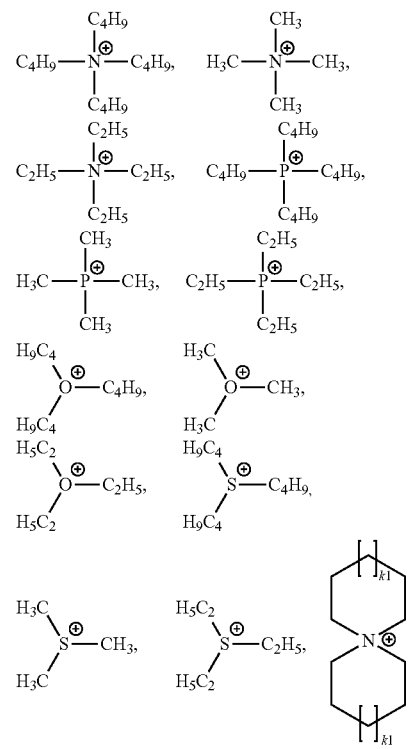

wherein k1 is the same or different, and each is an integer of 0 or more (particularly 0 to 3). Preferable are the following:

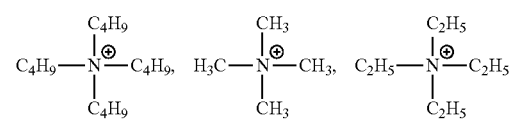

The molecular anion that can be contained in the salt containing a molecular ion is not particularly limited. In terms of ion conductivity (input and output characteristics of the nonaqueous secondary battery) and the operating potential of the nonaqueous secondary battery, preferable is an anion represented by Formula (2):

(2)

wherein Z is a boron atom or an atom of Group 15 of the periodic table; $R^2$ is the same or different, and is an alkyl group, an alkoxy group, a halogen atom, or a group represented by $-SO_2Rf$, wherein Rf is a fluorine atom or a fluoroalkyl group; and n is an integer of 2 to 6; a triflate anion ($CF_3SO_3^-$), or a perchlorate ion.

In Formula (2), Z is a boron atom or an atom of Group 15 of the periodic table (a nitrogen atom, a phosphorus atom, etc.). In terms of ion conductivity (input and output characteristics of the nonaqueous secondary battery) and the operating potential of the nonaqueous secondary battery, Z is preferably an atom of Group 15 of the periodic table (a nitrogen atom, a phosphorus atom, etc.), and more preferably a phosphorus atom.

In Formula (2), the alkyl group represented by $R^2$ is preferably a $C_{1-10}$ alkyl group, and more preferably a $C_{1-6}$ alkyl group, in terms of ion conductivity (input and output characteristics of the nonaqueous secondary battery) and the operating potential of the nonaqueous secondary battery. The alkyl group may be either a linear alkyl group or a branched alkyl group, and is preferably a linear alkyl group. Specific examples of the alkyl group include a methyl group, an ethyl group, an n-propyl group, an n-butyl group, etc.; and preferably an n-butyl group etc.

In Formula (2), the alkoxy group represented by $R^2$ may be substituted or unsubstituted. Examples of the substituent are not particularly limited, and include hydroxyl groups, halogen atoms (fluorine, chlorine, bromine, iodine, etc.), and the like. When the alkoxy group is substituted, the number of substituents is not particularly limited, and is, for example, 1 to 3.

In Formula (2), the halogen atom represented by $R^2$ is, for example, a fluorine atom, a chlorine atom, a bromine atom, an iodine atom, or the like; and preferably a fluorine atom.

In the group represented by $RfSO_2$— represented by $R^2$ in Formula (2), Rf is a fluorine atom or a fluoroalkyl group. Specific examples include —F, —$CF_3$, —$C_2F_5$, and the like. That is, examples of the group represented by $RfSO_2$— represented by $R^2$ in Formula (2) include $FSO_2$—, $CF_3SO_2$—, $C_2F_5SO_2$—, and the like.

In Formula (2), the number of $R^2$ is plural, and the plural number of $R^2$ may be the same or different.

In Formula (2), n, which represents the number of $R^2$, is variable depending on the type of Z, and is an integer of 2 to 6. Specifically, n is preferably 2 or 6 when Z is an atom of Group 15 (a nitrogen atom, a phosphorus atom, etc.), and n is preferably 4 when Z is a boron atom.

The molecular anion that satisfies the above conditions is not particularly limited. Examples include the following:

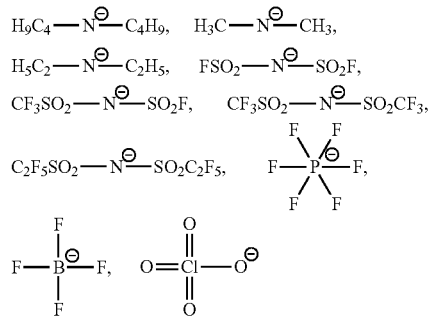

Preferable is the following:

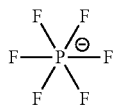

As the salt containing a molecular ion mentioned above, a salt comprising a molecular cation mentioned above and a monatomic anion, and a salt comprising a molecular anion mentioned above and a monatomic cation can be used. In order for the molecular ion (molecular anion or molecular cation) to more reliably function as the charge carrier (including a charge carrier comprising a molecular ion), it is preferable to use a salt consisting of molecular ions. Specifically, it is preferable to use a salt comprising a molecular cation mentioned above and a molecular anion mentioned above. When the molecular ion contains a molecular anion, the molecular ion may contain a single molecular anion or plural molecular anions. When the molecular ion contains a molecular cation, the molecular ion may contain a single molecular cation or plural molecular cations.

The salt comprising a molecular cation mentioned above and a molecular anion mentioned above is not particularly limited. Specific examples include tetrabutylammonium hexafluorophosphate, tetrabutylammonium perchlorate, tetramethylammonium tetrafluoroborate, and the like. These can be suitably used singly or in combination of two or more.

However, if the monatomic ion does not function as the charge carrier, a salt comprising a molecular cation mentioned above and a monatomic anion and/or a salt comprising a molecular anion mentioned above and a monatomic cation can also be used.

Examples of the salt comprising a molecular cation and a monatomic anion that can be used in this case include tetramethylammonium chloride, tetraethylammonium chloride, tetrabutylammonium chloride, tetramethylammonium bromide, tetraethylammonium bromide, tetrabutylammonium bromide, and the like. Moreover, examples of the salt comprising a molecular anion and a monatomic cation include lithium hexafluorophosphate ($LiPF_6$), lithium tetrafluoroborate ($LiBF_4$), lithium perchlorate ($LiClO_4$), lithium bis-trifluoromethanesulfonylimide ($LiN(CF_3SO_2)_2$) lithium bis-pentafluoroethanesulfonylimide ($LiN(C_2F_5SO_2)_2$), and the like. In general nonaqueous secondary batteries, alkali metal ions, such as lithium and sodium ions; alkaline earth metal ions; or the like function as a charge carrier; however, in the nonaqueous secondary battery of the present invention, only a molecular ion functions as a charge carrier (the charge carrier contained in the nonaqueous secondary battery of the present invention is only a molecular ion).

Even when a salt comprising a molecular cation and a molecular anion is used as the salt containing a molecular ion, in terms of obtaining a rocking-chair nonaqueous secondary battery in which the concentration of the electrolyte does not change during charging and discharging by allowing the same ion to move in and out of both the positive electrode and the negative electrode, it is preferable that only one of the molecular cation and the molecular anion functions as a charge carrier.

In addition to the salt consisting of molecular ions, when a salt comprising a molecular cation and a monatomic anion, a salt comprising a molecular anion and a monatomic cation, or the like is used, such a salt is not particularly limited. The content of the salt consisting of molecular ions (salt comprising a molecular cation mentioned above and a molecular anion mentioned above) is preferably 50 to 100 mol %, more preferably 80 to 100 mol %, and most preferably 100 mol %, based on the total amount of the electrolyte salts.

The electrolyte salt concentration (total amount of the salt consisting of molecular ions and other electrolyte salts (e.g., a salt comprising a molecular cation and a monatomic anion, and a salt comprising a molecular anion and a monatomic cation) of the nonaqueous secondary battery electrolyte of the present invention is not particularly limited. In terms of the capacity and cycle characteristics of the nonaqueous secondary battery to be produced, the electrolyte salt concentration is preferably 0.3 to 1.7 mol/L, and more preferably 0.4 to 1.5 mol/L. Among these, the concentration of the salt consisting of molecular ions is preferably 0.15 to 1.7 mol/L, and more preferably 0.32 to 1.5 mol/L.

In the nonaqueous secondary battery electrolyte of the present invention, a salt containing a charge carrier comprising a molecular ion mentioned above is used as the electrolyte salt. For other components, components conventionally used in nonaqueous secondary battery electrolytes can be similarly used. For example, the nonaqueous secondary battery electrolyte of the present invention preferably contains, in addition to a salt containing a charge carrier comprising a molecular ion mentioned above, an organic solvent in which the salt containing a molecular ion is dissolved.

The organic solvent that can be contained in the nonaqueous secondary battery electrolyte of the present invention is not particularly limited, as long as it is an organic solvent that can dissolve a salt containing a charge carrier comprising a molecular ion mentioned above. Examples include chain esters, such as dimethyl carbonate, diethyl carbonate, ethyl methyl carbonate, and methyl propyl carbonate; cyclic esters, such as ethylene carbonate, propylene carbonate, butylene carbonate, and vinylene carbonate; and the like. In terms of the solubility of the salt containing a molecular ion etc., cyclic esters are preferable, and propylene carbonate is more preferable.

The content of the organic solvent in the nonaqueous secondary battery electrolyte of the present invention may be an excess amount. Specifically, the content of the organic solvent can be adjusted so that the concentration of the electrolyte salt is within the above range.

In addition to the above components, the nonaqueous secondary battery electrolyte of the present invention may contain conventionally used additives etc.

Examples of such additives include the following:

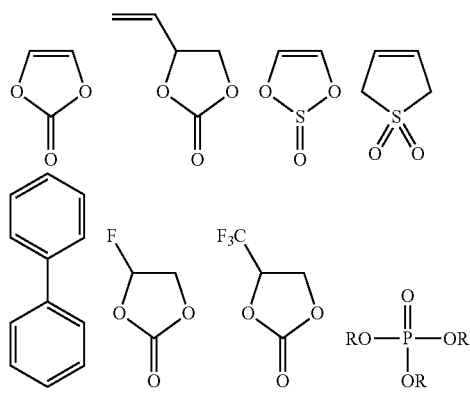

wherein R is an alkyl group mentioned above.

When the nonaqueous secondary battery electrolyte of the present invention contains the above additives, the additive content is not particularly limited, and is generally 0.01 to 10 mass %, and particularly 0.1 to 3 mass %.

The nonaqueous secondary battery electrolyte of the present invention can generally be a liquid electrolyte. Further, a gel electrolyte or the like obtained by gelling a liquid electrolyte with a gelling agent comprising a polymer etc. can also be used.

2. Nonaqueous Secondary Battery

The nonaqueous secondary battery of the present invention comprises the above nonaqueous secondary battery electrolyte. For other components and structures, components and structures used in conventionally known nonaqueous secondary batteries can be used. In general, the nonaqueous secondary battery of the present invention can comprise a positive electrode, a negative electrode, and a separator, in addition to the above nonaqueous secondary battery electrolyte.

Positive Electrode

The positive electrode can have a structure in which a positive electrode mixture layer containing a positive electrode active material, a binder, etc., is formed on one side or both sides of a positive electrode collector.

The positive electrode mixture layer can be produced by adding a binder to a positive electrode active material, described below, and an optionally added conductive material, dispersing the mixture in an organic solvent to prepare a paste for forming a positive electrode mixture layer (in this case, the binder may be previously dispersed or dissolved in an organic solvent), applying the paste to the surface (one side or both sides) of a positive electrode collector comprising a metal foil etc., and drying the applied paste to form a positive electrode mixture layer, optionally followed by a processing step.

The positive electrode active material may be a material that allows doping and dedoping of either of the above-mentioned molecular anions and molecular cations. It is preferable to appropriately select the positive electrode active material depending on the salt containing a charge carrier comprising a molecular ion contained in the nonaqueous secondary battery electrolyte of the present invention, and the molecular ion that functions as the charge carrier. Specifically, when the charge carrier is a molecular anion, it is preferable to use a material that allows doping and dedoping of molecular anions; and when the charge carrier is a molecular cation, it is preferable to use a material that allows doping and dedoping of molecular cations.

Material that Allows Doping and Dedoping of Molecular Anions

Among these, the material that allows doping and dedoping of molecular anions is not particularly limited. Examples include conductive polymers, organic radical polymers, polymers having a ferrocene skeleton, conductive carbon materials, organic sulfur compounds, and the like.

The conductive polymer is not particularly limited. Examples include polyvinylcarbazole, polybipyridine (poly (2,2'-bipyridine), poly(3,3'-bipyridine), poly(4,4'-bipyridine), etc.), polyacetylene, polyaniline, polypyrrole, polythiophene, polyarylene (poly(p-phenylene), poly (triphenylene), etc.), polyazulene, polyfluorene, polynaphthalene, polyanthracene, polyfuran, and the like.

The organic radical polymer is not particularly limited, and is preferably a radical polymer having a 2,2,6,6-tetramethylpiperidine-1-oxyl (TEMPO) skeleton. Specific examples include the following:

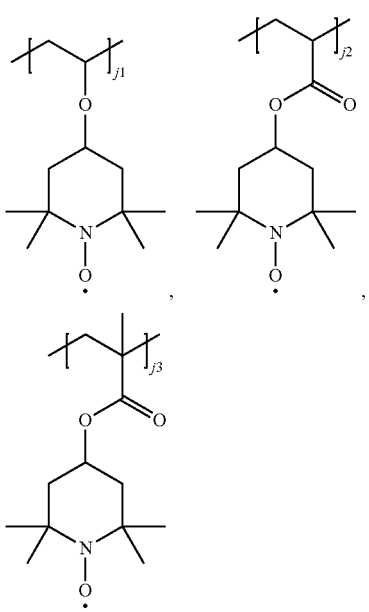

wherein j1, j2, and j3 are each an integer of 2 or more (particularly an integer of 2 to 10000).

Examples of the polymer having a ferrocene skeleton include polyferrocene and the like.

Examples of the conductive carbon material include carbon black, graphite, activated carbon, carbon nanotubes, and the like.

Examples of the organic sulfur compound include tetrathiafulvalenes and the like. The organic sulfur compound may be substituted with 1 to 4 hydroxyl groups, halogen atoms (fluorine, chlorine, bromine, iodine, etc.), amino groups, alkyl groups mentioned above, $C_{1-6}$ alkoxy groups (methoxy, ethoxy, etc.), cyano groups, fluoroalkyl groups mentioned above, or the like. Specific examples of the organic sulfur compound include the following:

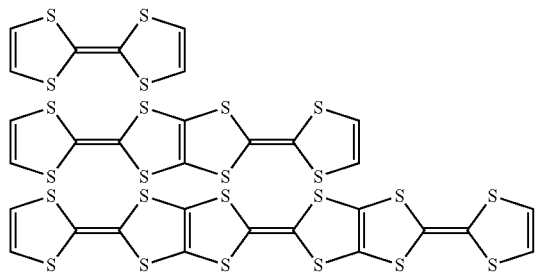

The above components may be used singly or in combination of two or more.

Among the above, the positive electrode active material that allows doping and dedoping of molecular anions is preferably a conductive polymer, and more preferably polyvinyl carbazole (poly(N-vinylcarbazole) etc.). That is, when a charge carrier comprising a molecular anion is used, a conductive polymer is preferably used, and polyvinyl carbazole (poly(N-vinylcarbazole) etc.) is more preferably used.

Material that Allows Doping and Dedoping of Molecular Cations

On the other hand, the material that allows doping and dedoping of molecular cations is not particularly limited. Examples include inorganic active materials, redox active molecules having a carbonyl group, redox active molecules having an imine skeleton, redox active molecules containing a sulfur atom, and the like that are generally used in nonaqueous secondary batteries, such as lithium ion secondary batteries.

The inorganic active material is not particularly limited. Examples include lithium cobaltite ($LiCoO_2$), lithium nickelate ($LiNiO_2$), lithium manganate ($LiMn_2O_4$), lithium iron phosphate ($LiFePO_4$), vanadium oxide-based materials, and the like.

The redox active molecule having a carbonyl group is not particularly limited. Examples include carboxylic acid anhydride, quinones, indigos, and the like.

The carboxylic acid anhydride is not particularly limited. Examples include the compounds described in Adv. Mater., 19, 1616-1621 (2007) etc., and specifically include the following:

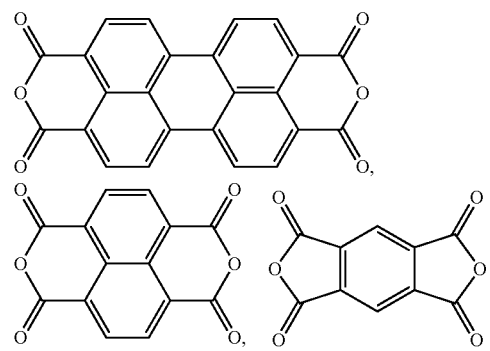

The quinone is not particularly limited. Examples include the compounds described in JP2008-112630A, WO2011/058873, etc., and specifically include the following:

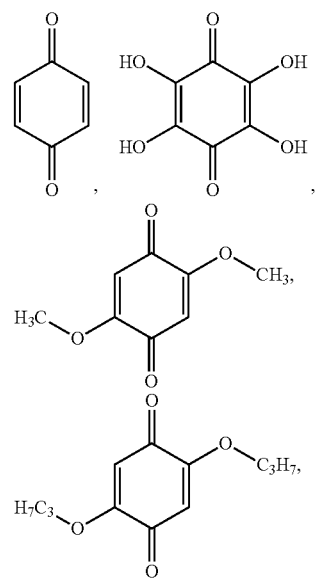

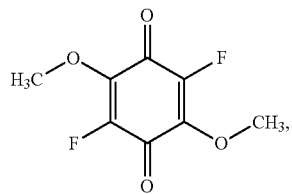
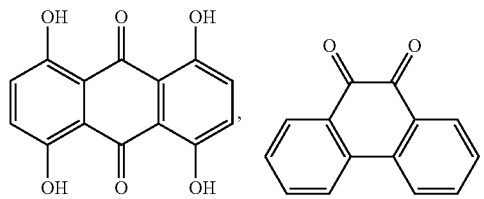
The indigo is not particularly limited. Examples include the compounds described in JP2011-103260A etc., and specifically include the following:
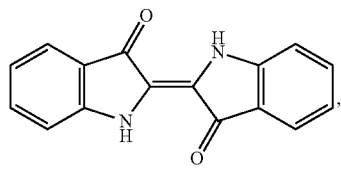
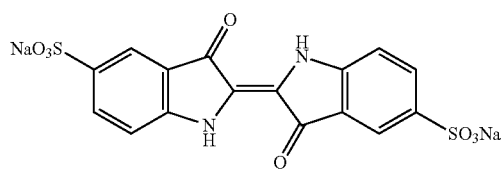
The redox active molecule having an imine skeleton is not particularly limited. Examples include the compounds described in JP2012-079479A etc., and specifically include the following:
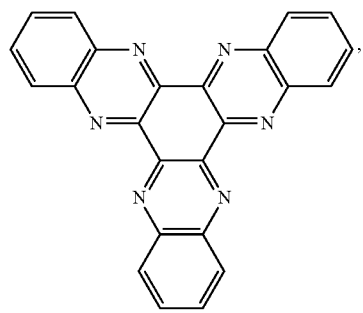
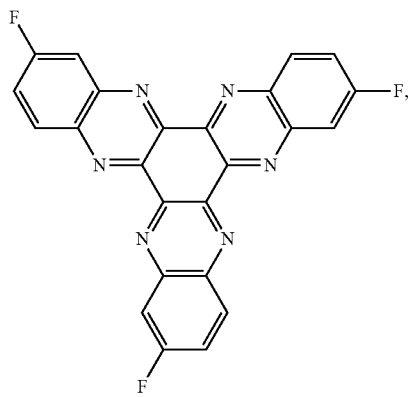
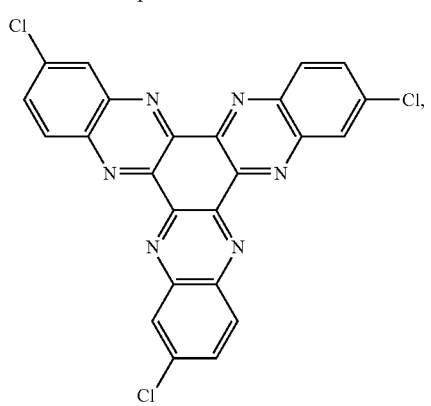
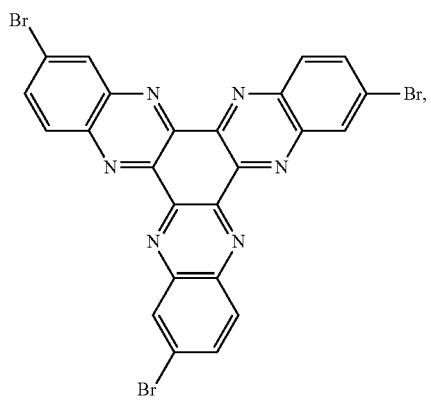
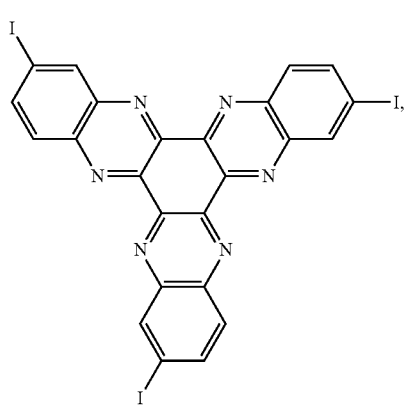

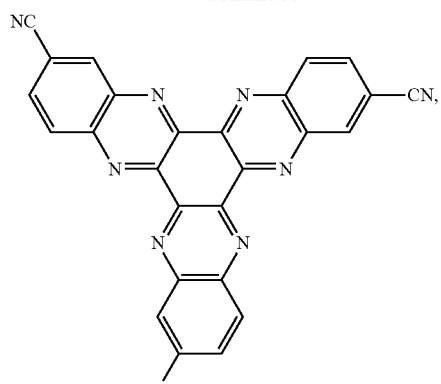
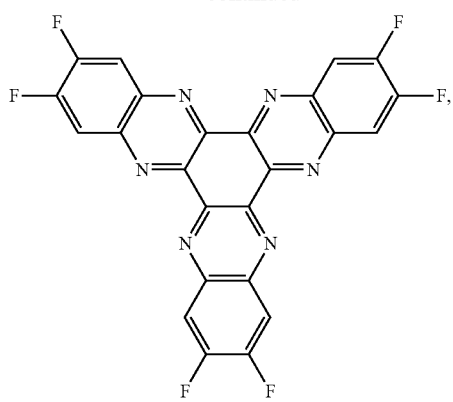
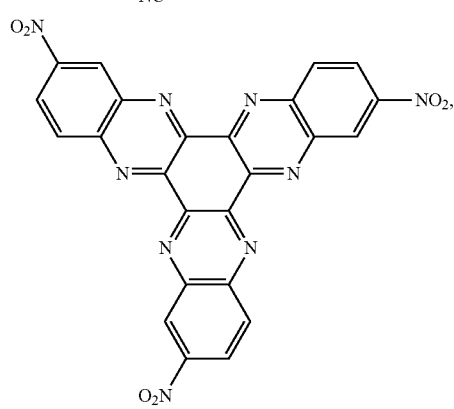
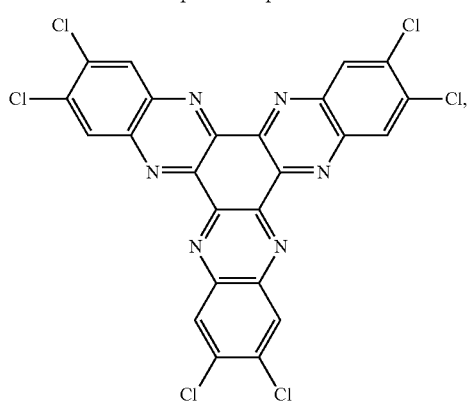
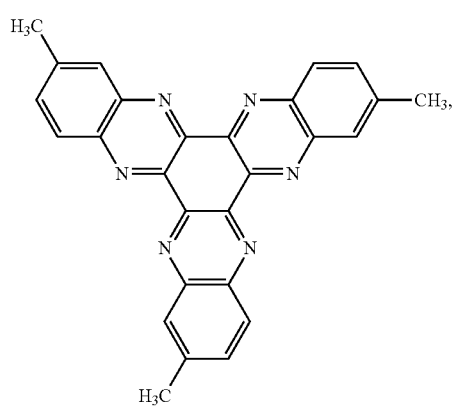
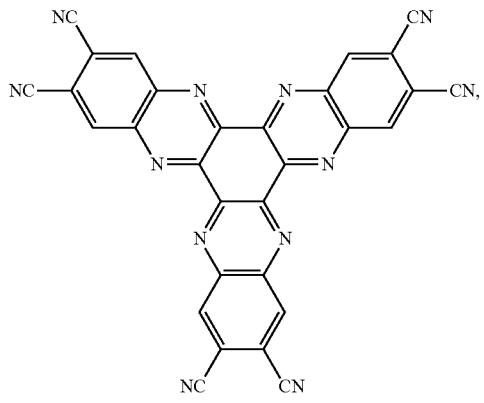
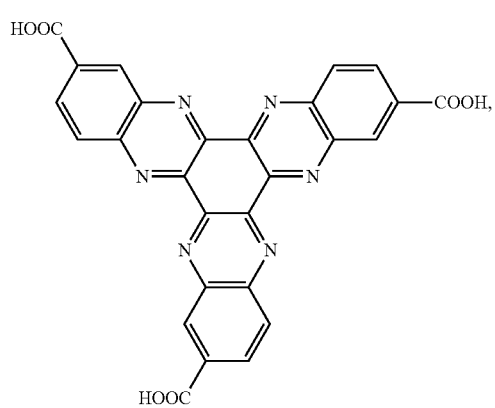
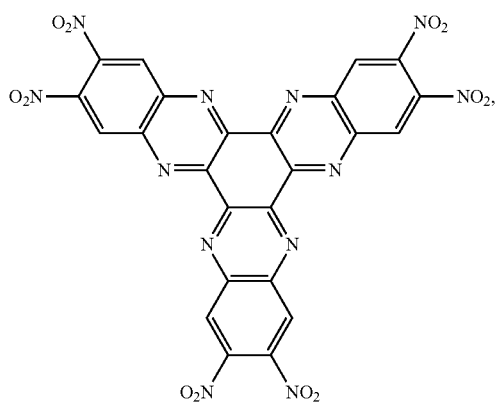

-continued

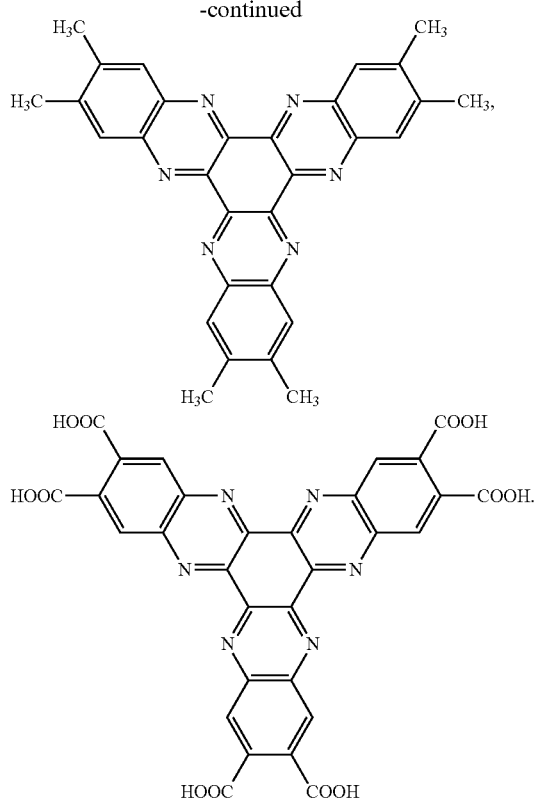

The redox active molecule containing a sulfur atom is not particularly limited. Examples include the compounds described in Adv. Mater. 14, 963-965 (2002) etc., and specifically include composite materials obtained by reacting polyacrylonitrile and sulfur by heating, and the like.

The above components may be used singly or in combination of two or more. However, when the above component is used as a positive electrode active material, it is preferable to use any of the above compounds doped with a molecular cation mentioned above.

Examples of the conductive material include, similar to general nonaqueous secondary batteries, graphite; carbon black (acetylene black, Ketjen black, etc.); amorphous carbon materials, such as carbon materials in which amorphous carbon is formed on the surface; fibrous carbon (vapor-grown carbon fibers, and carbon fibers obtained by spinning pitch, followed by carbonization); carbon nanotubes (various multilayer or single-layer carbon nanotubes); and the like. As the conductive material of the positive electrode, those mentioned above can be used singly or in combination of two or more.

Examples of the binder include polyvinylidene fluoride (PVDF), polytetrafluoroethylene, polyacrylic acid, styrene-butadiene rubber, and the like.

The organic solvent used in the production of the positive electrode mixture is not particularly limited. Examples include N-methylpyrrolidone (NMP) and the like. The organic solvent, a positive electrode active material, a binder, etc., can be used to form a paste state.

Regarding the composition of the positive electrode mixture layer, it is preferable, for example, that the amount of the positive electrode active material is about 70 to 95 mass %, and the amount of the binder is about 5 to 30 mass %. Moreover, when a conductive material is used, it is preferable that the amount of the positive electrode active material is about 50 to 90 mass %, the amount of the binder is about 5 to 20 mass %, and the amount of the conductive material is about 5 to 40 mass %. Furthermore, the thickness of the positive electrode mixture layer is preferably about 1 to 100 µm on one side of the collector.

Examples of the positive electrode collector include foils comprising aluminum, stainless steel, nickel, titanium, or an alloy thereof; punched metal, expanded metal, nets, and the like. In general, an aluminum foil having a thickness of about 10 to 30 µm is suitably used.

Negative Electrode

The negative electrode can have a structure in which a negative electrode mixture layer containing a negative electrode active material, a binder, etc., is formed on one side or both sides of a negative electrode collector.

The negative electrode mixture layer can be produced by adding a binder to a negative electrode active material and an optionally added conductive material, dispersing the mixture in an organic solvent to prepare a paste for forming a negative electrode mixture layer (in this case, the binder may be previously dispersed or dissolved in an organic solvent), applying the paste to the surface (one side or both sides) of a negative electrode collector comprising a metal foil etc., and drying the applied paste to form a negative electrode mixture layer, optionally followed by a processing step.

The negative electrode active material may be a material that allows doping and dedoping of either of the above-mentioned molecular anions and molecular cations. It is preferable to appropriately select the negative electrode active material depending on the salt containing a charge carrier comprising a molecular ion contained in the non-aqueous secondary battery electrolyte of the present invention, and the molecular ion that functions as the charge carrier. Specifically, when a material that allows doping and dedoping of molecular anions is used as the positive electrode active material, in order for a molecular anion to function as a charge carrier, it is also preferable to use a material that allows doping and dedoping of molecular anions. Moreover, when a material that allows doping and dedoping of molecular cations is used as the positive electrode active material, in order for a molecular cation to function as a charge carrier, it is also preferable to use a material that allows doping and dedoping of molecular cations. However, the same materials are not selected as the negative electrode active material and the positive electrode active material.

In a more preferable embodiment, when a molecular anion is caused to function as a charge carrier, it is preferable to select a compound that facilitates doping of the molecular anion during charging as the positive electrode active material, and to select a compound that facilitates dedoping of the molecular anion during charging as the negative electrode active material. Moreover, when a molecular cation is caused to function as a charge carrier, it is preferable to select a compound that facilitates dedoping of the molecular cation during charging as the positive electrode active material, and to select a compound that facilitates doping of the molecular cation during charging as the negative electrode active material.

As such a negative electrode active material, materials that allow doping and dedoping of molecular anions mentioned above, and materials that allow doping and dedoping of molecular cations mentioned above can be used singly or in combination of two or more. However, when a material that allows doping and dedoping of molecular anions is used as the negative electrode active material (when a molecular anion is caused to function as a charge carrier), it is preferable to use a compound doped with a molecular anion mentioned above as the material that allows doping and dedoping of molecular anions.

Examples of the conductive material include, similar to general nonaqueous secondary batteries, graphite; carbon black (acetylene black, Ketjen black, etc.); amorphous carbon materials, such as carbon materials in which amorphous carbon is formed on the surface; fibrous carbon (vapor-grown carbon fibers, and carbon fibers obtained by spinning pitch, followed by carbonization); carbon nanotubes (various multilayer or single-layer carbon nanotubes); and the like. As the conductive material of the negative electrode, those mentioned above can be used singly or in combination of two or more.

Examples of the binder include polyvinylidene fluoride (PVDF), polytetrafluoroethylene, polyacrylic acid, styrene-butadiene rubber, and the like.

The organic solvent used in the production of the negative electrode mixture is not particularly limited. For example, N-methylpyrrolidone (NMP) or the like can be used to form a paste state.

Regarding the composition of the negative electrode mixture layer, it is preferable, for example, that the amount of the negative electrode active material is about 70 to 95 mass %, and the amount of the binder is about 5 to 30 mass %. When a conductive material is used, it is preferable that the amount of the negative electrode active material is about 5 to 40 mass %, the amount of the binder is about 5 to 20 mass %, and the amount of the conductive material is about 5 to 40 mass %. Furthermore, the thickness of the negative electrode mixture layer is preferably about 1 to 100 μm on one side of the collector.

Examples of the negative electrode collector include foils comprising aluminum, copper, stainless steel, nickel, titanium, or an alloy thereof; punched metal, expanded metal, meshes, nets, and the like. In general, an aluminum mesh having a thickness of about 5 to 30 μm is suitably used.

Separator

The above positive electrode and negative electrode are used, for example, in the form of a laminated electrode body in which these electrodes are laminated through a separator, or a rolled electrode body obtained by winding the laminated electrode body in a spiral.

The separator is preferably one that has sufficient strength and is capable of maintaining a large amount of electrolyte. From such a viewpoint, the separator is preferably a fine porous film, non-woven fabric, or the like that has a thickness of 10 to 50 μm and an aperture ratio of 30 to 70%, and contains one or more of polyethylene, polypropylene, an ethylene-propylene copolymer, etc. However, since dendrite formation cannot occur in principle in the present invention, separators that do not have sufficient strength (paper etc.) can also be used. Thus, there is a wide range of options for the separator.

Moreover, examples of the form of the nonaqueous secondary battery of the present invention include cylindrical shapes (a rectangular cylindrical shape, a circular cylindrical shape, etc.) that use a stainless steel can, an aluminium can, etc., as an outer can. Further, soft-package batteries using a laminate film integrated with a metal foil as their exterior bodies can also be used.

EXAMPLES

The present invention is described in detail below based on Examples. However, the following Examples do not limit the present invention.

Example 1

The electrolyte used was a 1 M solution containing tetrabutylammonium hexafluorophosphate (produced by Tokyo Chemical Industry Co., Ltd.), which was a salt comprising the following cation:

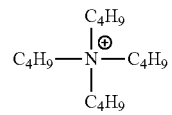

and the following anion:

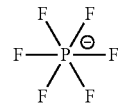

dissolved in propylene carbonate (produced by Kishida Chemical Co., Ltd.).

Next, poly(N-vinylcarbazole) (PVK; produced by Sigma-Aldrich; molecular weight: $1.1 \times 10^6$ g/mol), which was used as a positive electrode active material, acetylene black and vapor-grown carbon fibers as a conductive material, and polyvinylidene fluoride (PVDF) as a binder were dispersed in N-methylpyrrolidone (NMP) at a mass ratio of positive electrode active material, conductive material, and binder of 5:4:1 (the content ratio of acetylene black and vapor-grown carbon fibers in the conductive material was 1:1 (mass ratio)), thereby obtaining a positive electrode mixture. The positive electrode mixture was applied to an aluminum foil (thickness: 20 μm) and dried, followed by compression bonding, thereby producing a positive electrode.

Furthermore, as a negative electrode active material, poly(1,1'-pentyl-4,4'-bipyridinium ditetrabutylammonium hexafluorophosphate) (PBPy) (polymerization degree: 30 to 50) was synthesized by mixing 4,4'-bipyridine and 1,5-dibromopentane at a molar ratio of 1:1 in dimethylformamide, and condensing them by heating and stirring (150° C., 2 hours), followed by an ion exchange reaction using an excess amount of ammonium hexafluorophosphate.

$^1$H-NMR (DMSO-$d_6$): δ 9.4 (4H), 8.8 (4H), 4.7 (4H), 2.1 (4H) 1.5 (2H). $^{13}$C-NMR (DMSO-$d_6$): δ 149, 146, 127, 61, 31, 23. Elemental analysis $(C_{15}H_{18}F_{12}N_2P_2)_n$: C, 34.90; H, 3.51; N, 5.43%. Found: C, 34.56; H, 3.69; N, 5.17%.

The negative electrode active material was mixed with acetylene black as a conductive material, and polytetrafluoroethylene (PTFE) as a binder at a ratio of active material, conductive material, and binder of 4:5:1 to form a sheet. The resulting sheet was compression-bonded to an aluminum mesh (thickness: 110 μm) to thereby produce a negative electrode.

The produced electrodes were independently charged and discharged in a three-electrode electrochemical cell using the above electrolyte. The electrodes were each taken out from the cell after a predetermined number of cycles (positive electrode: 10 cycles, negative electrode: 1 cycle), and arranged opposite to each other across a glass filter as a separator. Further using the above electrolyte, a coin-type battery was produced.

Test Example 1: Charge-Discharge Test

Figure 2:
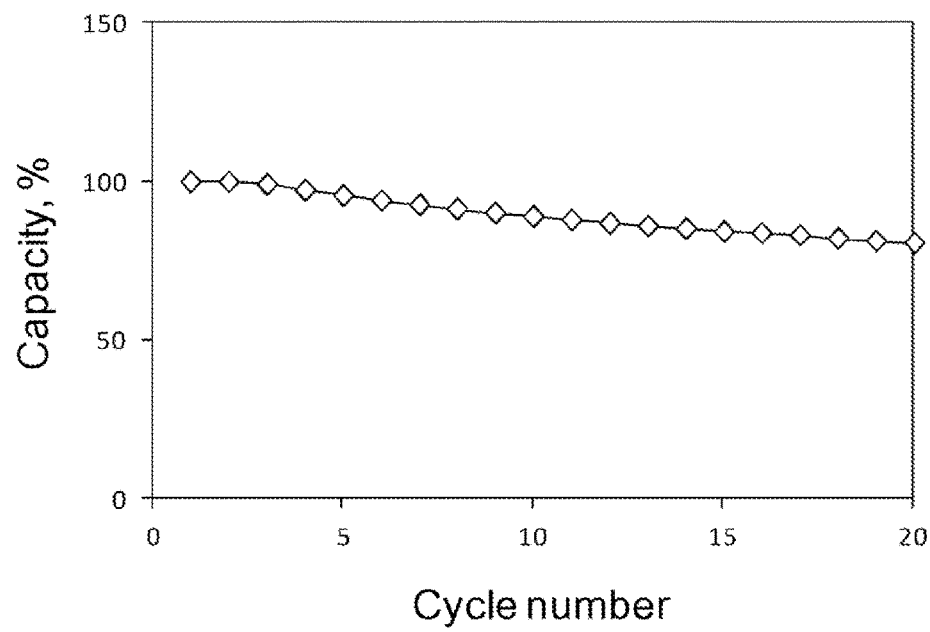
FIG. 2 is a graph showing the results of Test Example 1 (charge-discharge test of Example 1; cycle characteristics).

The coin-type battery obtained in Example 1 was subjected to a charge-discharge test in an atmosphere at 30° C. at a current density of 100 mA/g (PVK) within a voltage range of 0.0 to 3.2 V. FIGS. 1 and 2 show the results.

FIG. 1 shows charge-discharge curves. The intermediate voltage in the discharge curve is about 1.8 V. It is suggested that even when monatomic ions, such as lithium ions or sodium ions, are not contained as a charge carrier, molecular ions can function as the charge carrier, and that the resulting battery can function as a battery.

FIG. 2 shows the cycle change of discharge capacity. The reduction in the capacity when charge and discharge were repeated was small. The capacity after 20 cycles was about 80% of the initial discharge capacity (first cycle), and the cycle characteristics were excellent. Thus, a battery having excellent cycle characteristics was produced.

Test Example 2: EDX Measurement

Figure 3:
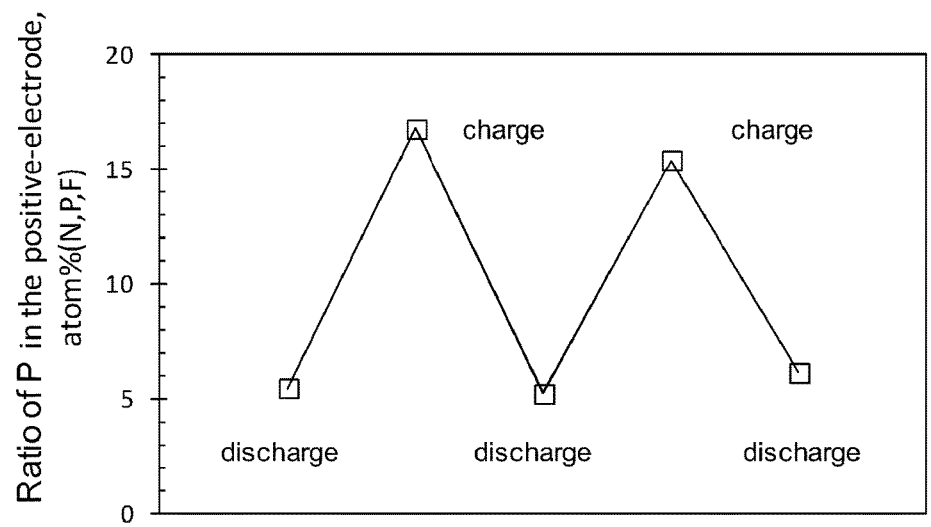
FIG. 3 is a graph showing the results of Test Example 2 (energy dispersive X-ray spectroscopy (EDX) measurement of the positive electrode of Example 1).
Figure 4:
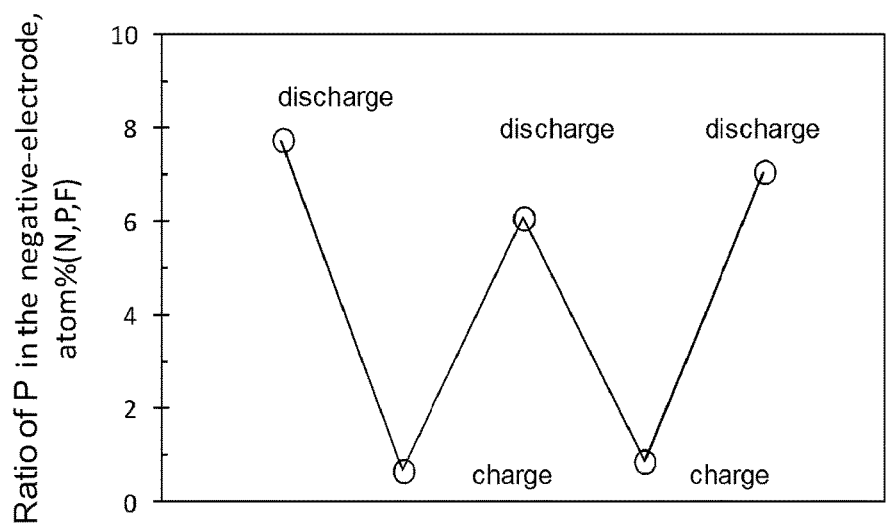
FIG. 4 is a graph showing the results of Test Example 2 (energy dispersive X-ray spectroscopy (EDX) measurement of the negative electrode of Example 1).

The coin-type battery obtained in Example 1 was charged and discharged in the same manner as in Test Example 1. During charging and discharging of the battery, the change in the concentration of P (phosphorus atom) in the positive electrode and the negative electrode was measured by energy dispersive X-ray spectroscopy (EDX). FIGS. 3 and 4 show the results.

The components containing P (phosphorus atom) in the coin-type battery obtained in Example 1 are only molecular anions $PF_6^-$ contained in the electrolyte, and molecular anions $PF_6^-$ present in the negative electrode active material. This means that when the P (phosphorus atom) concentration changes during charging and discharging, the $PF_6^-$ concentration changes ($PF_6^-$ is doped or dedoped).

FIG. 3 shows the change in the concentration of P (phosphorus atom) during charging and discharging of the positive electrode. It can be understood that in the positive electrode, the P (phosphorus atom) concentration increases during charging, and decreases during discharging. This suggests that the molecular anions $PF_6^-$ are doped into the positive electrode (particularly the positive electrode active material) during charging, and that the molecular anions $PF_6^-$ are dedoped from the positive electrode (particularly the positive electrode active material) during discharging.

FIG. 4 shows the change in the concentration of P (phosphorus atom) during charging and discharging of the negative electrode. It can be understood that in the negative electrode, contrary to the positive electrode, the P (phosphorus atom) concentration decreases during charging, and increases during discharging. This suggests that the molecular anions $PF_6^-$ are dedoped from the negative electrode (particularly the negative electrode active material) during charging, and that the molecular anions $PF_6^-$ are doped into the negative electrode (particularly the negative electrode active material) during discharging.

In light of the above, the molecular anions $PF_6^-$ are dedoped from the negative electrode (particularly the negative electrode active material), and doped into the positive electrode (particularly the positive electrode active material) during charging. During discharging, the molecular anions $PF_6^-$ are dedoped from the positive electrode (particularly the positive electrode active material), and doped into the negative electrode (particularly the negative electrode active material). This suggests that in the coin-type battery obtained in Example 1, only the molecular anions $PF_6^-$ function as a rocking-chair charge carrier.

Example 2

As an electrolyte, tetramethylammonium trifluoromethanesulfonylimide, which was a salt comprising the following cation:

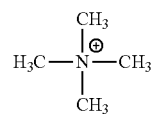

and the following anion:

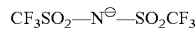

was synthesized in the following manner. 5 mmol of tetramethylammonium chloride (produced by Kanto Chemical Co., Inc.) and 8 mmol of lithium trifluoromethanesulfonylimide (produced by Kanto Chemical Co., Inc.) were each dissolved in methanol, and both mixtures were mixed and stirred. Distilled water was added to the resulting mixed solution, and concentrated by an evaporator. The deposit was filtered and dried to thereby obtain a desired product. The obtained salt was dissolved in triglyme (produced by Kishida Chemical Co., Ltd.), and the concentration was adjusted to 0.1 M. Thus, an electrolyte was prepared.

As the positive electrode active material, a 1,4,8,11-tetrahydroxydibenzo[b,i]thianthrene tetrakis(tetramethylammonium) salt, which was a positive electrode active material containing a tetramethyl ammonium cation, was synthesized by the following reaction pathway.

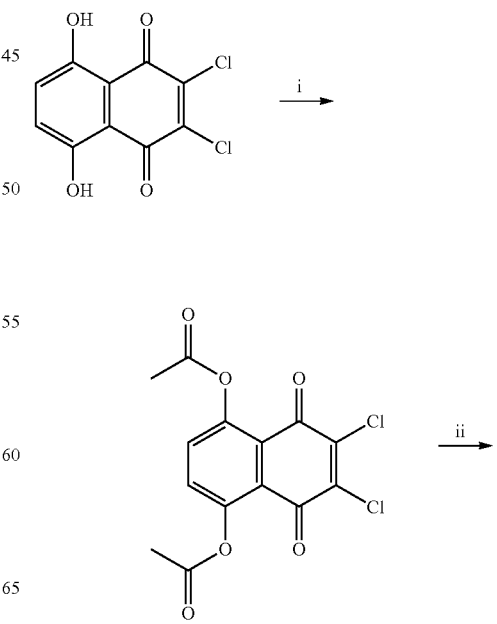

-continued

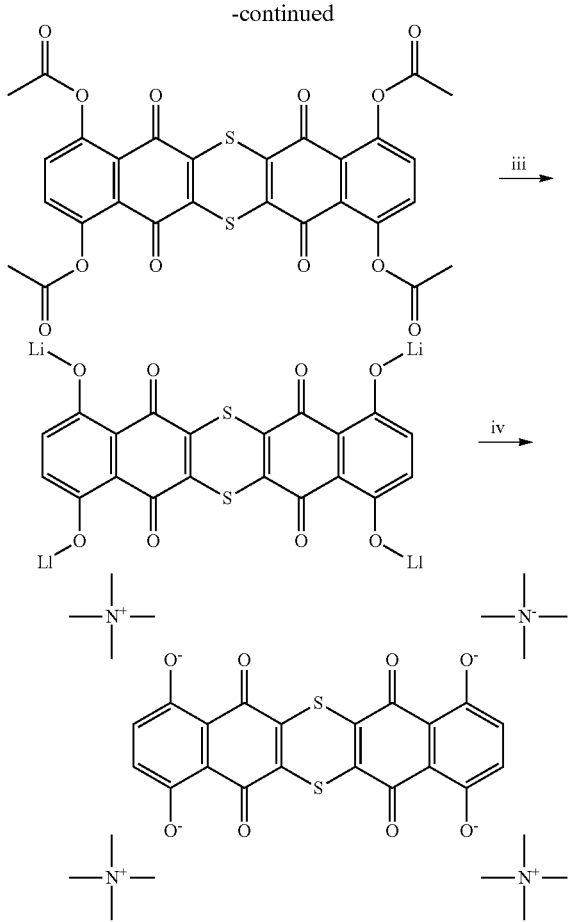

First, the hydroxy groups of 2,3-dichloro-5,8-dihydroxy-1,4-naphthoquinone (produced by Tokyo Chemical Industry Co., Ltd.) were protected by acetyl using acetic anhydride (i). Then, the compound was induced into a molecule having a dibenzo[b,i]thianthrene skeleton by reaction with rubeanic acid (ii). Next, the acetyl groups were deprotected under base conditions (iii), and an ion exchange reaction using an excess amount of tetramethylammonium chloride was conducted (iv). Thus, the target compound was obtained.

M.p.>400° C., $^1$H-NMR (DMSO-d6): δ 6.5 (s, 4H), 3.1 (s, 48H).

The positive electrode active material (3 mg) was mixed with acetylene black as a conductive material, and polytetrafluoroethylene (PTFE) as a binder at a ratio of active material, conductive material, and binder of 4:5:1 to form a sheet. The resulting sheet was compression-bonded to an aluminum mesh (thickness: 110 μm), thereby producing a positive electrode.

As the negative electrode active material, 5,7,12,14-pentacenetetrone (produced by Tokyo Chemical Industry Co., Ltd.) (1 mg) was used. The negative electrode active material was mixed with acetylene black and PTFE at the same ratio as in the positive electrode to form a sheet. The resulting sheet was compression-bonded to an aluminum mesh to thereby produce a negative electrode.

The produced electrodes were arranged opposite to each other across a glass filter as a separator. Further using the above electrolyte, an R2032-type coin battery was produced.

Test Example 3: Charge-Discharge Test

Figure 5:
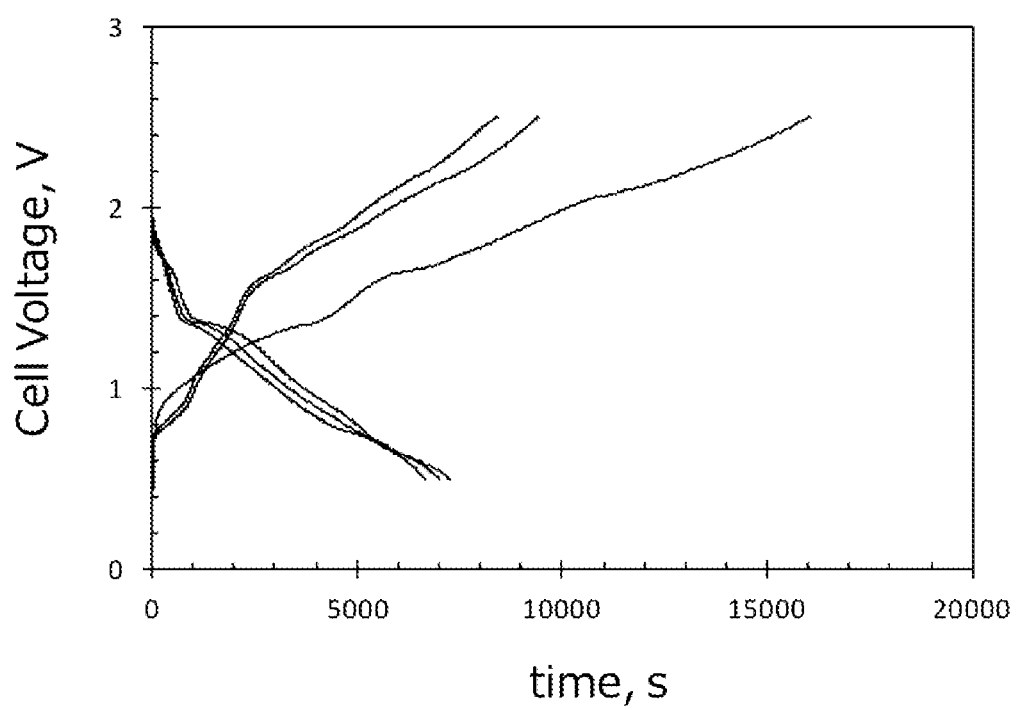
FIG. 5 is a graph showing the results of Test Example 3 (charge-discharge test of Example 2; charge-discharge curves).

The coin-type battery obtained in Example 2 was subjected to a charge-discharge test in an atmosphere at 30° C. at a current density of 20 mA/g (positive electrode active material) within a voltage range of 0.5 to 2.5 V. FIG. 5 shows the results.

FIG. 5 shows charge-discharge curves. The average voltage of the discharge curves was about 1.0 V, and several numbers of charge and discharge cycles were possible. In the case of this battery system, the electrolyte contains only a molecular compound as an ionic species. Even in such a case, the resulting battery could function as a battery.

The invention claimed is:

1. A nonaqueous secondary battery electrolyte comprising a salt containing a charge carrier comprising a molecular ion, wherein the salt containing a molecular ion is a salt comprising:
   a molecular cation represented by Formula (1):

wherein Y is an atom of Group 15 or 16 of the periodic table; each $R^1$ is, independently, an alkyl group, an alkoxy group, or a halogen atom; two $R^1$ may be bonded to form a ring together with adjacent Y; and m is 3 or 4; and
   a triflate anion ($CF_3SO_3^-$), a perchlorate ion, or a molecular anion represented by Formula (2):

wherein Z is an atom of Group 15 of the periodic table; each $R^2$ is, independently, an alkyl group, an alkoxy group, a halogen atom, or a group represented by $—SO_2Rf$, wherein Rf is a fluorine atom or a fluoroalkyl group; and n is an integer of 2 to 6.

2. The nonaqueous secondary battery electrolyte according to claim 1, which is free from a charge carrier comprising an alkali metal ion.

3. The nonaqueous secondary battery electrolyte according to claim 1, wherein the salt containing a charge carrier comprising a molecular ion is a salt consisting of molecular ions.

4. A nonaqueous secondary battery comprising the nonaqueous secondary battery electrolyte according to claim 1.

5. The nonaqueous secondary battery according to claim 4, further comprising a positive electrode containing a positive electrode active material, and a negative electrode containing a negative electrode active material;
   wherein the positive electrode active material and the negative electrode active material are both materials that allow doping and dedoping of molecular anions, or the positive electrode active material and the negative electrode active material are both materials that allow doping and dedoping of molecular cations.

6. The nonaqueous secondary battery according to claim 5, wherein the materials that allow doping and dedoping of molecular anions are at least one member selected from the group consisting of conductive polymers, organic radical polymers, polymers having a ferrocene skeleton, conductive carbon materials, and organic sulfur compounds.

7. The nonaqueous secondary battery according to claim 5, wherein the materials that allow doping and dedoping of molecular cations are at least one member selected from the group consisting of inorganic active materials, redox active molecules having a carbonyl group, redox active molecules having an imine skeleton, and redox active molecules containing a sulfur atom.

8. The nonaqueous secondary battery according to claim 4, which is a rocking-chair battery.

9. The nonaqueous secondary battery electrolyte according to claim 2, wherein the salt containing a charge carrier comprising a molecular ion is a salt consisting of molecular ions.

10. A nonaqueous secondary battery comprising the nonaqueous secondary battery electrolyte according to claim 2.

11. A nonaqueous secondary battery comprising the nonaqueous secondary battery electrolyte according to claim 3.

12. The nonaqueous secondary battery according to claim 10, further comprising a positive electrode containing a positive electrode active material, and a negative electrode containing a negative electrode active material;
wherein the positive electrode active material and the negative electrode active material are both materials that allow doping and dedoping of molecular anions, or the positive electrode active material and the negative electrode active material are both materials that allow doping and dedoping of molecular cations.

13. The nonaqueous secondary battery according to claim 11, further comprising a positive electrode containing a positive electrode active material, and a negative electrode containing a negative electrode active material;
wherein the positive electrode active material and the negative electrode active material are both materials that allow doping and dedoping of molecular anions, or the positive electrode active material and the negative electrode active material are both materials that allow doping and dedoping of molecular cations.

14. The nonaqueous secondary battery according to claim 12, wherein the materials that allow doping and dedoping of molecular anions are at least one member selected from the group consisting of conductive polymers, organic radical polymers, polymers having a ferrocene skeleton, conductive carbon materials, and organic sulfur compounds.

15. The nonaqueous secondary battery according to claim 13, wherein the materials that allow doping and dedoping of molecular anions are at least one member selected from the group consisting of conductive polymers, organic radical polymers, polymers having a ferrocene skeleton, conductive carbon materials, and organic sulfur compounds.

16. The nonaqueous secondary battery according to claim 12, wherein the materials that allow doping and dedoping of molecular cations are at least one member selected from the group consisting of inorganic active materials, redox active molecules having a carbonyl group, redox active molecules having an imine skeleton, and redox active molecules containing a sulfur atom.

17. The nonaqueous secondary battery according to claim 13, wherein the materials that allow doping and dedoping of molecular cations are at least one member selected from the group consisting of inorganic active materials, redox active molecules having a carbonyl group, redox active molecules having an imine skeleton, and redox active molecules containing a sulfur atom.

\* \* \* \* \*